No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 1.

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 2.

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 4.

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 5.

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 6.

Witnesses: Wilhelm Vogt, Thomas M. Smith

Inventor: Albert Gee, by J. Walter Douglas, Attorney

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 7.

Witnesses
Wilhelm Vogt
Thomas M. Smith

Inventor
Albert Gee,
By J. Walter Douglas
Attorneys

THE NORRIS PETERS CO., PHOTO-LITHO., WASHINGTON, D. C.

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 8.

No. 703,055. Patented June 24, 1902.
A. GEE.
ATTACHMENT FOR MAKING OPEN OR LACE WORK IN STRAIGHT KNITTING MACHINES.
(Application filed July 3, 1901.)
(No Model.) 9 Sheets—Sheet 9.

UNITED STATES PATENT OFFICE.

ALBERT GEE, OF PHILADELPHIA, PENNSYLVANIA, ASSIGNOR TO THE BROWN KNITTING COMPANY, OF PHILADELPHIA, PENNSYLVANIA, A CORPORATION OF PENNSYLVANIA.

ATTACHMENT FOR MAKING OPEN OR LACE WORK IN STRAIGHT-KNITTING MACHINES.

SPECIFICATION forming part of Letters Patent No. 703,055, dated June 24, 1902.

Application filed July 3, 1901. Serial No. 66,995. (No model.)

*To all whom it may concern:*

Be it known that I, ALBERT GEE, a subject of the King of England, residing at the city of Philadelphia, in the county of Philadelphia and State of Pennsylvania, have invented certain new and useful Improvements in Attachments for Making Open or Lace Work in Straight-Knitting Machines, of which the following is a specification.

My invention has relation to attachments for that class of knitting-machines known as "straight" or "flat" machines, whereby said machines may readily knit lace or open work meshes in conjunction with the regular or closed meshes in fabricating the article; and in such connection it relates to the general construction and arrangement of such attachments for the said purposes.

The principal object of my invention is to provide in a straight or flat machine a simple, efficient, and inexpensive attachment whereby the machine is adapted to knit lace or open work of varying patterns, the said attachment being strong and not liable to disarrangement.

In the carrying out of my invention a set of lace transfer-needles or lace-points are used which operate somewhat in the same manner as the fashioning transfer-needles or fashioning-points, but have an independent transverse movement to the right or left to transfer certain meshes according to the pattern of lace or open work desired.

The nature and scope of my invention will be more fully understood from the following description, taken in connection with the accompanying drawings, forming part hereof, in which—

Referring to the drawings, it will be understood that the mechanism comprising the attachment embodying my invention has been illustrated as applied to a straight-knitting machine of the usual or "cotton" type, and hence many of the ordinary parts of that machine have not been illustrated and only such parts have been shown as are necessary for a proper understanding of my said invention.

Figure 1:
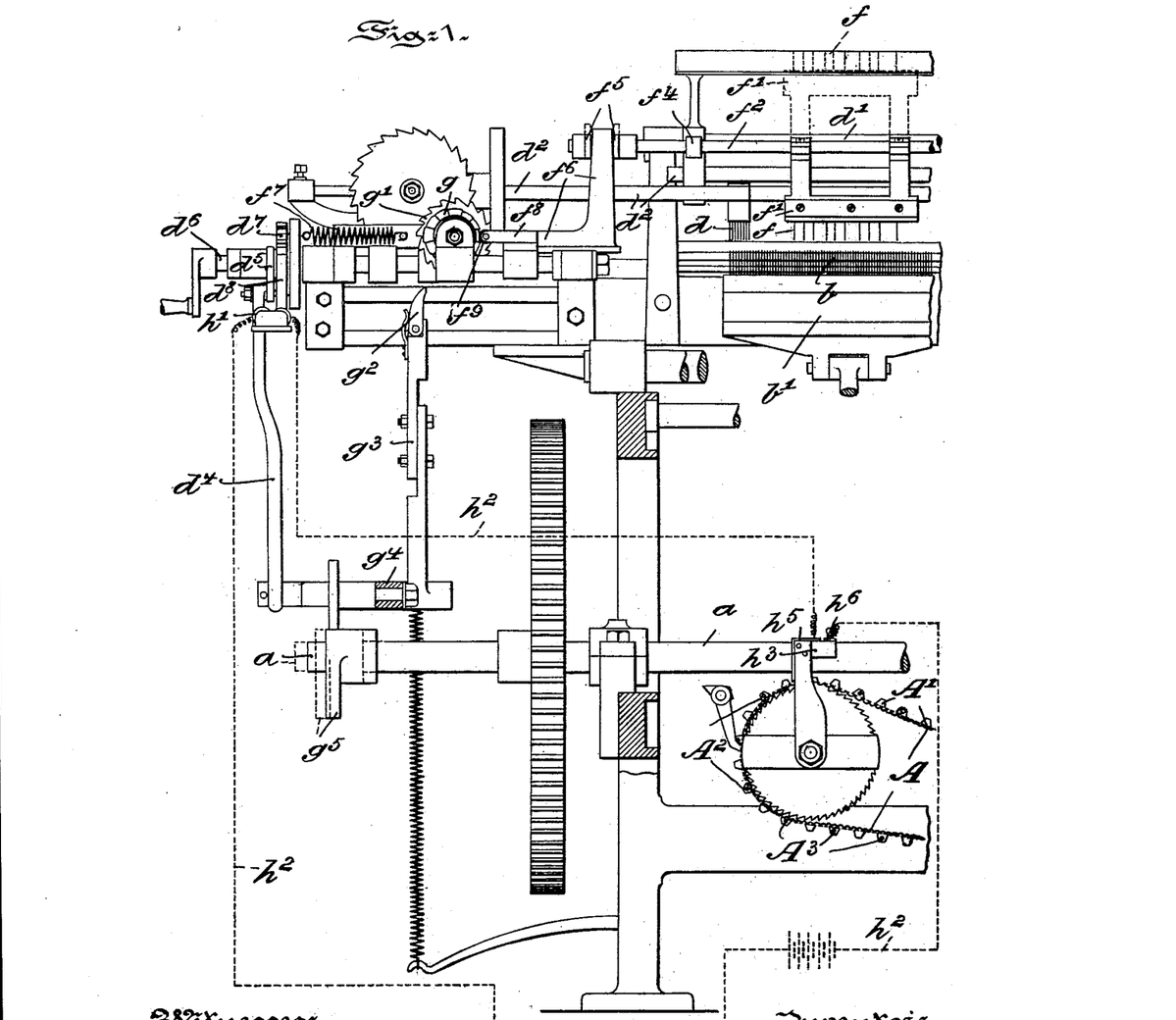
Figure 1 is a front elevational view of a portion of a straight or flat knitting machine and of the attachment in operative position thereon and embodying main features of my invention.
Figure 2:
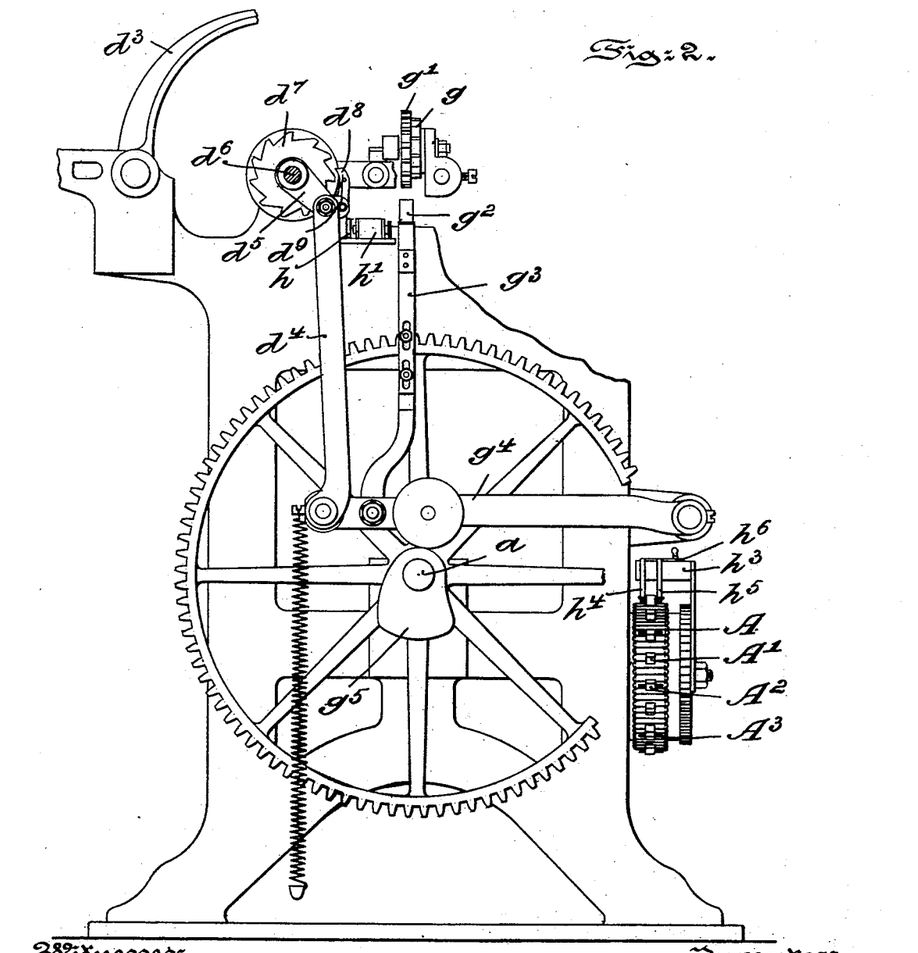
Fig. 2 is an end elevational view of the same.
Figures 3, 4, 5:
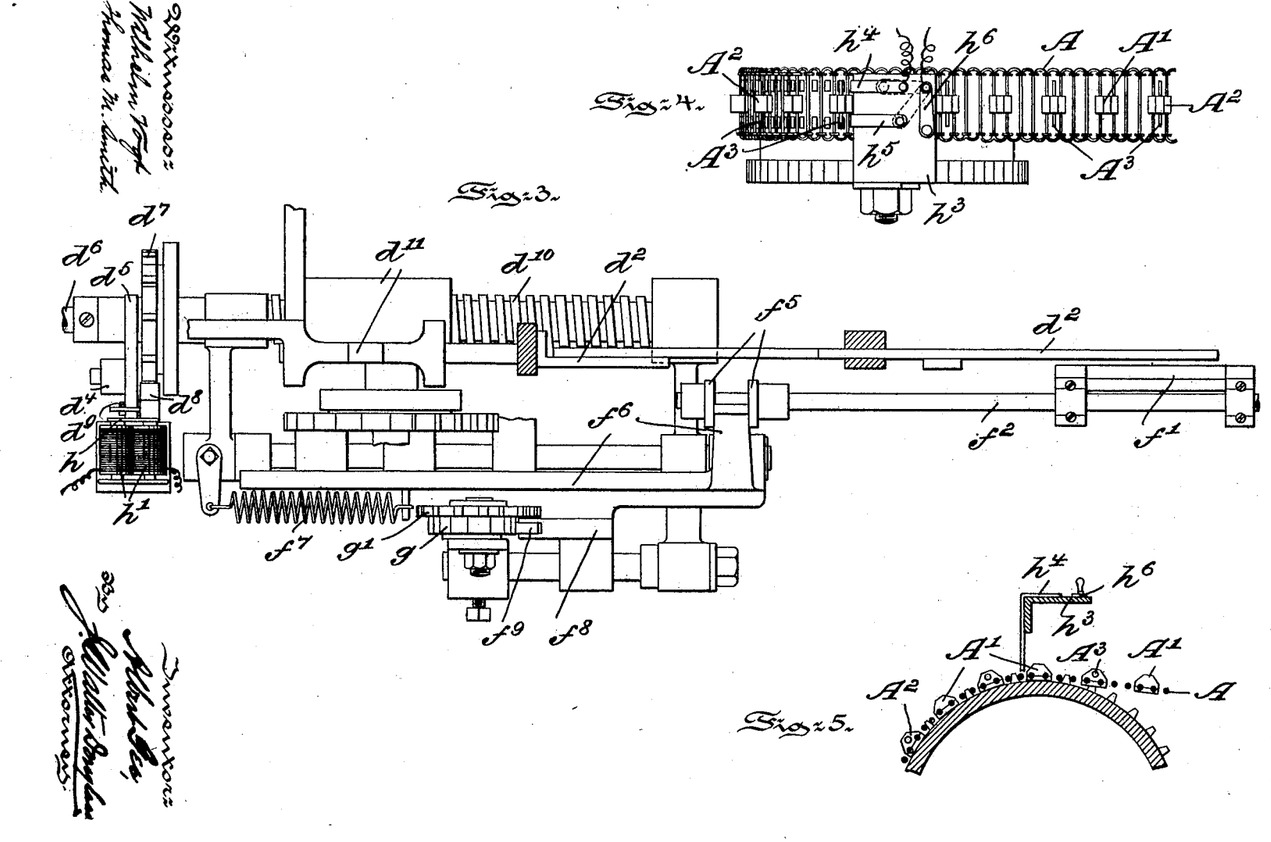
Fig. 3 is an enlarged top or plan view of Fig. 2.
Fig. 4 is a top or plan view, enlarged, of the pattern-chain normally controlling the vertical movement of the fashioning and the lace points and in conjunction with auxiliaries controlling the transverse or transferring movement of the fashioning-points during the lace or open work operation.
Fig. 5 is a vertical sectional view of Fig. 4.
Figures 6, 7:
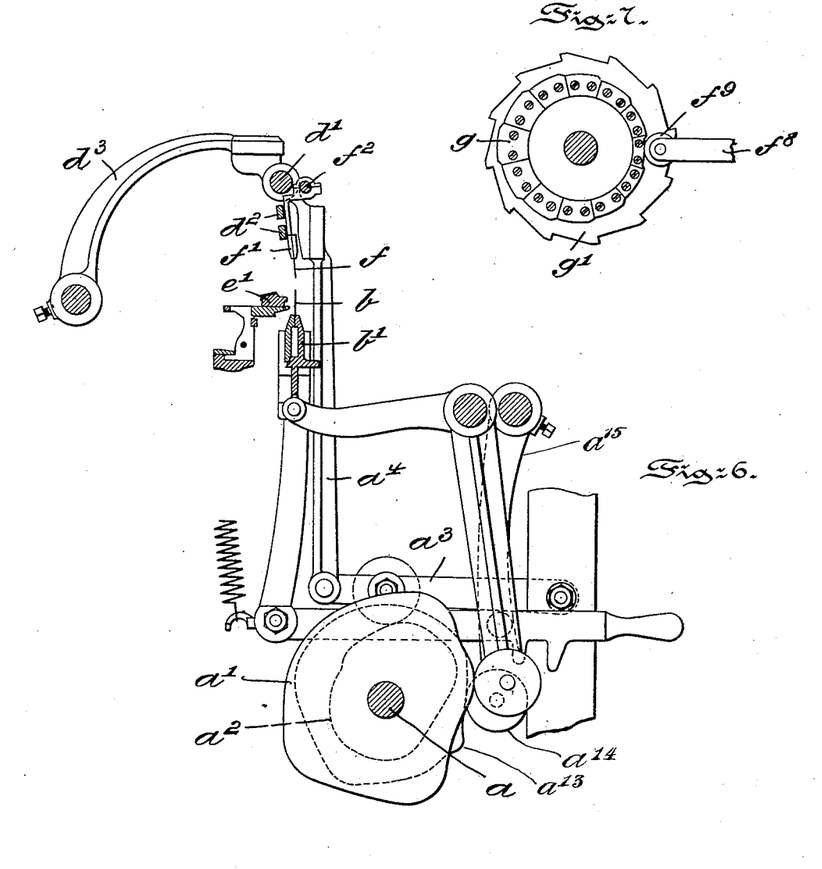
Fig. 6 is an enlarged cross-sectional view of the machine, illustrating the operating mechanism for the needle-bar, the lace-points, and the fashioning-points.
Fig. 7 is an enlarged side elevational view of the pattern-wheel governing the transverse or transferring movement of the lace-points.
Figure 8:
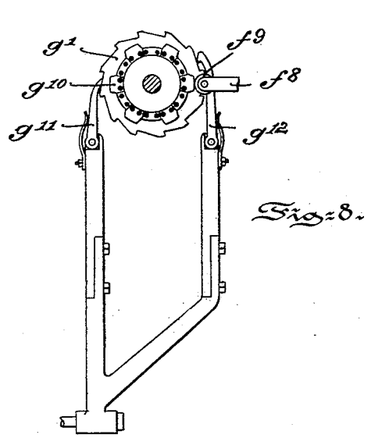
Fig. 8 is a view similar to Fig. 7, but illustrating a modified form of pattern-wheel.
Figures 9, 10:
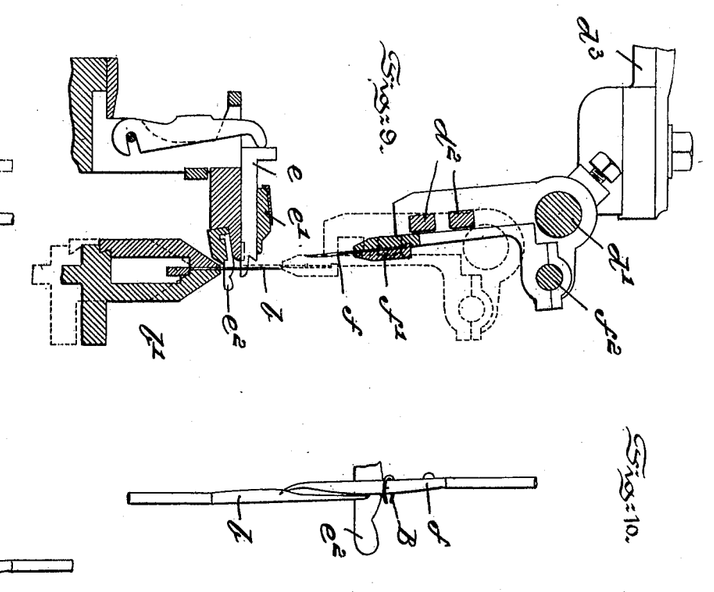
Fig. 9 is a still further enlarged vertical section corresponding to Fig. 6.
Figs. 10, 11, 12, and 13 are enlarged views illustrating the successive positions of the lace-points and auxiliaries during the transferring or lacework operation.
Figure 20:
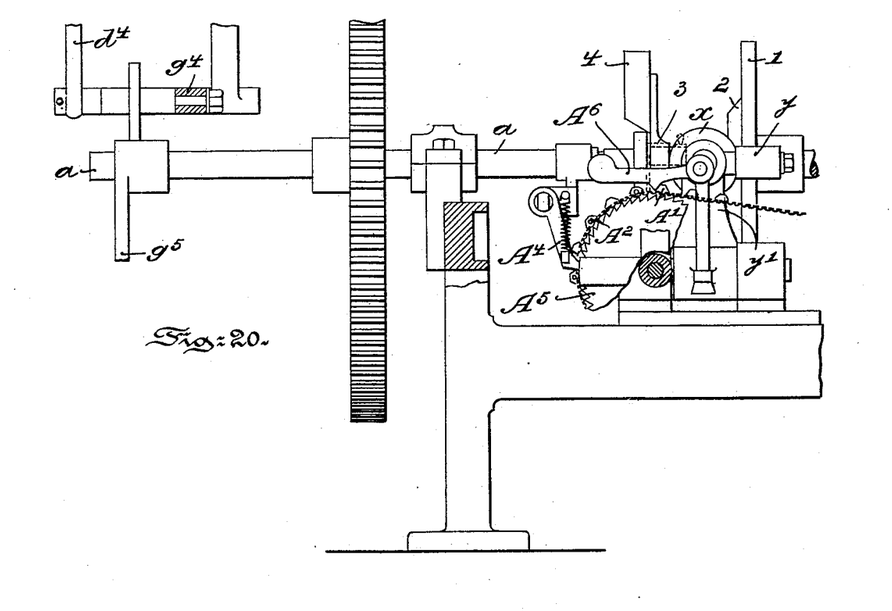
Fig. 20 is a view corresponding to Fig. 1, but illustrating only the lower portion of the machine, certain parts being broken away to illustrate the mechanism whereby the pattern-chain actuates the shogging-shaft.
Figure 21:
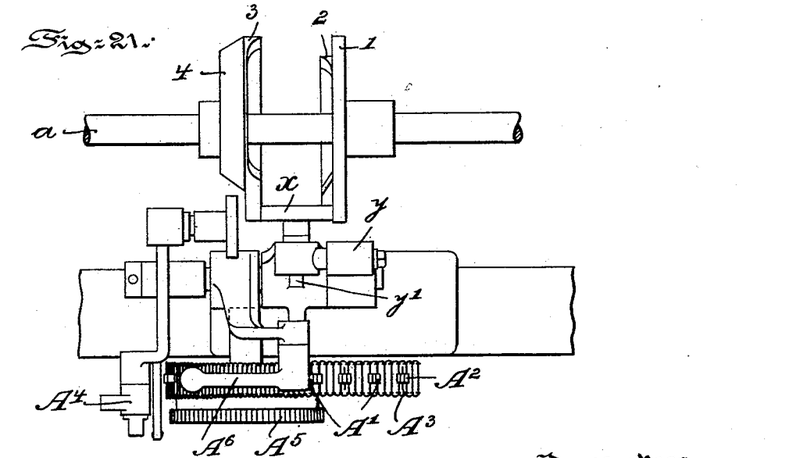
Fig. 21 is a top or plan view of Fig. 20.
Figure 22:
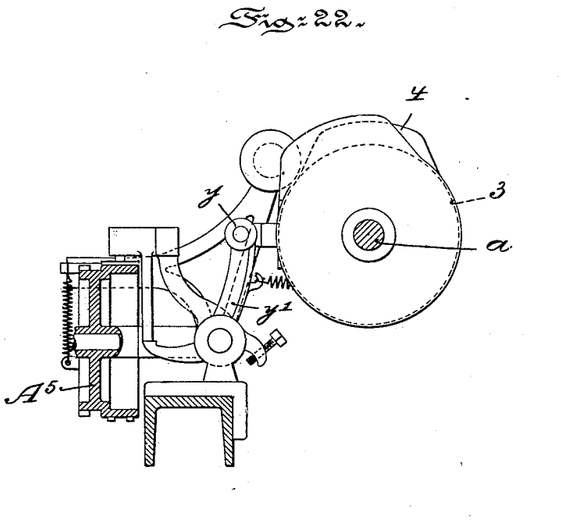
Fig. 22 is a side elevational view of Fig. 20.

The shogging-shaft $a$ is adapted to be shifted laterally by mechanism controlled by the pattern-chain A. This mechanism is substantially the same as the corresponding mechanism illustrated, for instance, in Letters Patent No. 658,826, dated October 2, 1900, and is sufficiently illustrated in Figs. 20 to 22, inclusive, and, briefly stated, it consists as follows: The shaft $a$ has the usual set of four cams 1, 2, 3, and 4, between cams 2 and 3 of which the shogging-truck $x$ is at certain intervals adapted to rest. The cam 4 actuates, through well-known mechanism, a pawl $A^4$, which operates the ratchet pattern-wheel $A^5$. The cam-surface 2 serves to shift the shogging-shaft $a$ from left to right, whereas the other cam 3 shifts the shaft $a$ from right to left. The cam 1 moves the shogging-truck $x$ out of engagement with cams 2 and 3 through roller $y$ and arm $y'$, whereas a pattern lug or button $A'$ or $A^2$ serves, through lever-arm $A^6$ and other well-known means, to shift the shogging-truck $x$ into engagement with cam-surfaces 2 and 3. The shaft $a$ carries a series of cams, (see Figs. 6 and 9,) one of which, $a'$, operating through suitable mechanism the needle-bed $b'$, containing the knitting-needles $b$. The shaft $a$ also carries a cam $a^2$, adapted to rock an arm $a^3$, which controls, through the link $a^4$, the mechanism which gives the vertical movement to the fashioning-points $d$ at the proper times. The sinker-bars $e$ shift back and forth in their bed $e'$ in the usual manner, and in the bed $e'$ are also located the knocking-over bits $e^2$, which serve to cast off the meshes after they are formed by the regular needles. In addition to these old and well-known parts, for the purpose of enabling the machine to knit open or lace work meshes in conjunction with the regular meshes, there is provided a set of lace-points $f$, depending from a bar $f'$, which is supported from a shaft $f^2$, arranged longitudinally in the machine. The shaft $f^2$ is adapted to be raised and lowered, and it is also adapted when lowered or during the raising and lowering operations to be shifted longitudinally either to the right or left to cause the necessary transfer movement of the points $f$. The raising and lowering of the shaft $f^2$ to accomplish the vertical movement of the lace-points $f$ is obtained through the following preferred mechanism: The shaft $d'$, from which the bar $d^2$ containing the fashioning-points depends, is supported by brackets $d^3$, pivoted at one end in the framework of the machine. To the other end of one or both of these brackets $d^3$ is secured the link $a^4$, operated, as hereinbefore described, by the arm $a^3$ and cam $a^2$ on the main shaft $a$. The shaft $d'$ also carries the bearings $f^4$ for the shaft $f^2$, from which depends the bar $f'$ and lace-points $f$, and hence for every up-and-down movement of the fashioning-shaft $d'$ and points $d$ there is a corresponding movement to the shaft $f^2$ and lace-points $f$. While this arrangement will be found economical and demands but few additions to the complicated machine, it is manifest that, if desired, the vertical movements to both sets of points $d$ and $f$ could be obtained by independent mechanisms, one being the duplicate of the other. The shaft $f^2$ must, however, be capable of lateral or longitudinal shifting in its bearings $f^4$, since it is necessary in the formation of many patterns of lacework that the lace-points $f$ be moved either from left to right or right to left, and it is also necessary that the transferring movement of the lace-points $f$ be independent of the corresponding movement of the fashioning-points $d$, since said fashioning-points $d$ operate to transfer meshes only at certain parts of the fabric, while the lacework formed by the lace-points $f$ should ordinarily extend along the entire fabric. For these reasons and among others hereinafter explained, the shaft $f^2$, with the needle-bar $f'$, and lace-points $f$, have a movement in a longitudinal direction independent of the lateral or longitudinal movement of the fashioning-points $d$. A preferred form of mechanism for shifting the shaft $f^2$ laterally or longitudinally in the machine is as follows: At one end of the shaft $f^2$ is secured two collars or projections $f^5$, between which is fitted one end of a right-angled slide $f^6$, the other end being under the tension of a spring $f^7$, normally tending to retract the slide $f^6$ and the shaft $f^2$ from right to left. Upon the slide $f^6$ is formed an arm $f^8$, provided at its free end with a roller $f^9$, resting upon the periphery of a pattern-disk $g$, secured to the face of a ratchet-wheel $g'$. The ratchet-wheel and its pattern-disk $g$ are moved step by step by a pawl $g^2$, secured to the end of a rod $g^3$, projecting upward from a lever-arm $g^4$. This lever-arm $g^4$ is raised and lowered by means of a cam $g^5$, located on the main or driving shaft $a$. (See Figs. 1 and 2.) This cam $g^5$ comes under the arm $g^4$ when the shaft $a$ is shifted laterally by the pattern-chain A. The pattern-disk $g$ in the main form of the invention is arranged with its periphery eccentric to the axis of the wheel $g'$, since by this arrangement for half the revolution of the disk and wheel the arm $f^8$ will be shifted step by step toward the right against the tension of the spring $f^7$, while for the other half of the revolution of the disk and wheel the arm $f^8$ shifts step by step from right to left under the tension of the spring $f^7$. This alternate shifting of the arm $f^8$, slide $f^6$, and the shaft $f^2$ results, as will be hereinafter more fully explained, in the transfer of meshes, so as to make a zigzag pattern, as indicated in Figs. 15 and 16. Should, however, the pattern-disk $g'$ of Fig. 7 be replaced by the pattern-disk $g^{10}$ of Fig. 8 and the single-acting pawl $g^2$ of Fig. 1 be replaced by a double-acting pawl $g^{11}$ and $g^{12}$ of Fig. 8, the revolution of the disk $g^{10}$ will cause the arm $f^8$, shaft $f^2$, and lace-points $f$ to shift by steps alternately to the right and left, resulting in the transfer of meshes from one needle always to the adjacent right-hand needle, and thereby forming in the fabric lines or stripes of open or lace work meshes. For the sake of economy and to prevent a multiplication of parts the arm $g^4$ also serves at the proper times to shift the bar $d^2$, carrying the fashioning-needles $d$. For this purpose from the arm $g^4$ extends (see Figs. 1 and 2) the link $d^4$, pivotally connected at its free or upper end to a crank-arm $d^5$, swinging loosely upon a shaft $d^6$, to which a ratchet-wheel $d^7$ is secured. The link $d^4$ also carries a spring-controlled pawl $d^8$, normally held out of engagement with the ratchet-wheel $d^7$ by its spring $d^9$. When, however, the fashioning operation is to take place, this pawl $d^8$ is thrown into operative engagement with ratchet $d^7$ by means of the following preferred mechanism: The pawl $d^8$ is pivoted intermediate of its ends and on its lower end is formed an armature $h$ for an electromagnet $h'$, included in a battery-circuit $h^2$, normally broken or closed by means of a switch located above the pattern-chain A. This switch (see Figs. 4 and 5) comprises two contacts $h^4$ and $h^5$, depending from a bracket $h^3$, and a switch-lever $h^6$, adapted to either engage the contact $h^4$ or contact $h^5$ or to be disengaged from both contacts. When disengaged from both contacts, the circuit is permanently broken, since one pole or terminal of the battery-circuit leads to the contact $h^4$, while the other terminal leads to the switch-lever $h^6$. When fashioning is to take place, the switch-lever $h^6$ is moved over to engage the contact $h^5$. The movement of the pattern-chain A now controls the making and breaking of the battery-circuit, as follows: On the pattern-chain A are two series of buttons $A'$ and $A^2$, one series $A^2$ carrying contact-pins $A^3$, which as the chain A travels contacts with both depending contacts $h^4$ and $h^5$, thus completing the circuit through the electromagnet, and thereby throwing the pawl $d^8$ into engagement with the ratchet $d^7$, and thereby causing upon the elevation of the link $d^4$ the advancement of the ratchet $d^7$ one tooth and a corresponding turning of the shaft $d^6$. This shaft $d^6$ has a screw-threaded portion $d^{10}$, (see Fig. 3,) controlling in the usual manner by means of a slide $d^{11}$ the shifting movement of the bar $d^2$, carrying the fashioning-points $d$. This independent control of the means for shifting the fashioning-points $d$ by means of the pattern-chain A permits of the transferring or lacework operation being continued during the main fashioning operation without either operation interfering with the other. Ordinarily in the lacework operation the lace-points are shifted at the completion of three courses of regular meshes, while the fashioning-points are shifted only after the completion of six courses of regular meshes. If, therefore, the lace-points and fashioning-points were both shifted by the same mechanism, it would be impossible during the fashioning operation to form lacework, except at the times when the fashioning is to take place, and vice versa. By the independent control of the shifting mechanism for the sets of lace and fashioning points this disadvantage is overcome, and not only is this accomplished, but the lace-points may be moved in either direction step by step without interfering with the uniform movement of the fashioning-points in one direction only.

Figure 18:
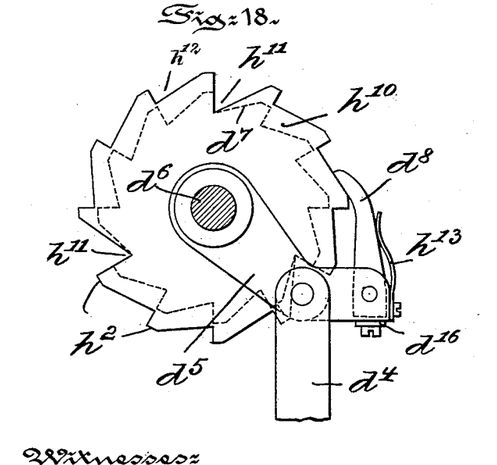
Figs. 18 and 19 are enlarged views, respectively, in side and end elevation of a modified form of the mechanism of Fig. 17.
Figure 19:
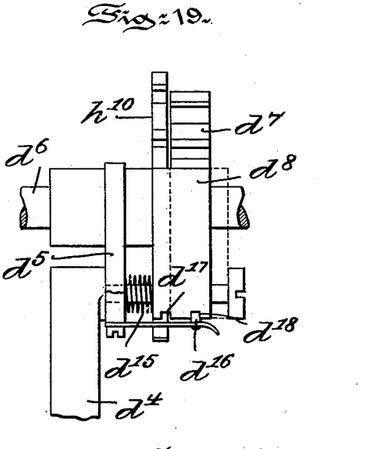

In Figs. 18 and 19 a mechanical means for controlling the independent shifting of the fashioning-points is illustrated as the equivalent for the electrical means hereinbefore described. In this form the pawl $d^8$ rests normally upon the toothed periphery of a ratchet-wheel $h^{10}$, loosely turning on the shaft $d^6$, although it has sufficient frictional engagement therewith to prevent its turning, except when actuated by the movement of the pawl $d^8$. The periphery of the ratchet-wheel $h^{10}$ has at intervals a tooth $h^{11}$ deeper than the other teeth $h^{12}$, and when this deep tooth $h^{11}$ is reached the pawl $d^8$, under the influence of a spring $h^{13}$, is thrown inward and engages a tooth of the ratchet-wheel $d^7$, situated alongside the ratchet-wheel $h^{10}$. A movement upward of the pawl $d^8$ will now advance the ratchet $d^7$ and turn the shaft $d^6$, to which the ratchet $d^7$ is secured.

Figure 11:
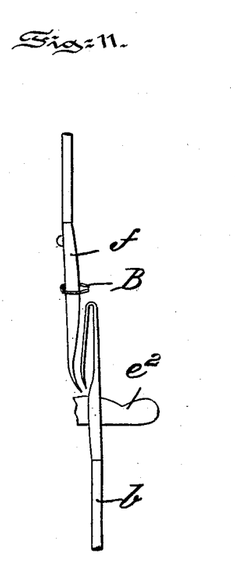
Figure 12:
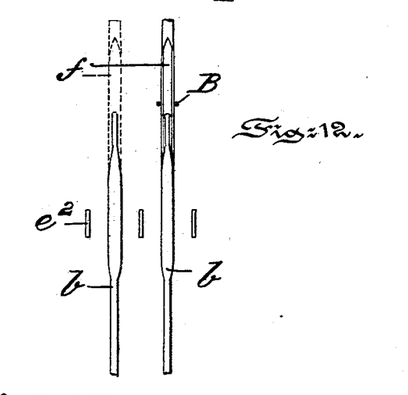
Figure 13:
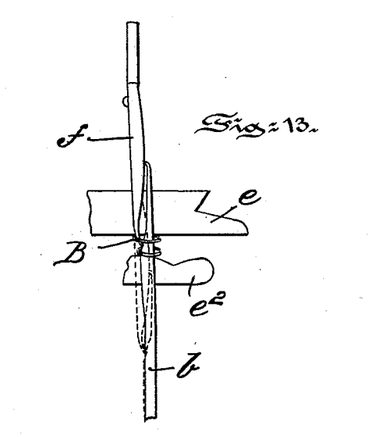
Figure 14:
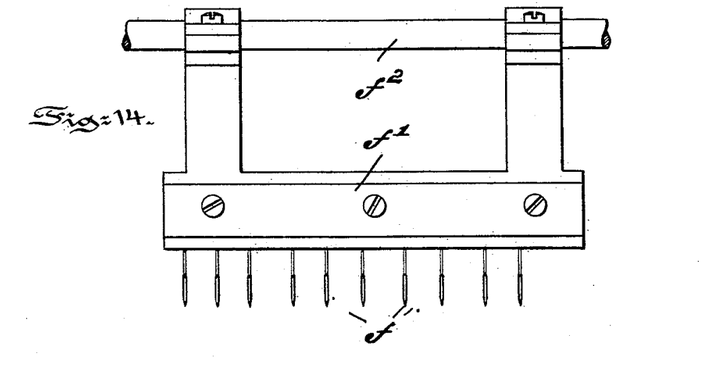
Fig. 14 is an enlarged front elevational view of the lace-points and the bar in which they are held.
Figure 15:
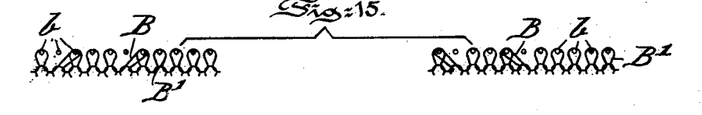
Figs. 15 and 16 are views of the fabric formed by the arrangement of lace-points and operating mechanism, shown in the preceding figures except Fig. 8.
Figure 16:
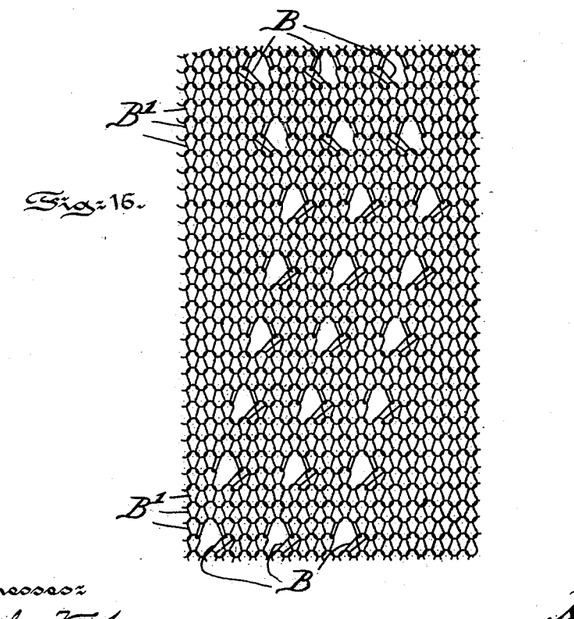
Figure 17:
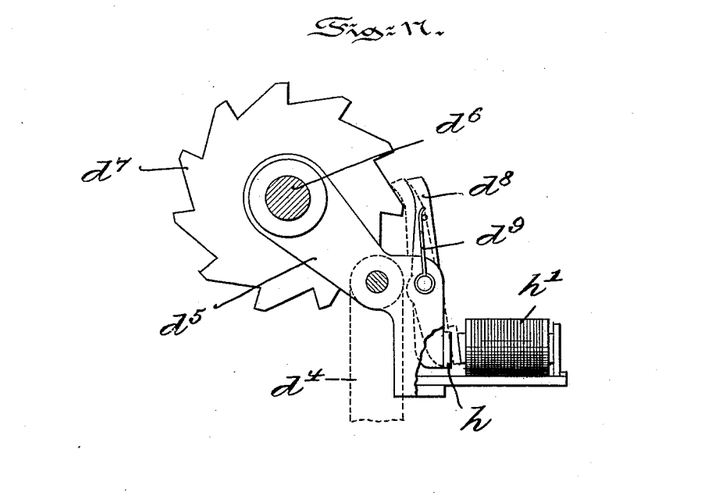
Fig. 17 is an enlarged detail view illustrating in side elevational view the mechanism normally permitting the fashioning and lace points to act independently.
Figure 23:
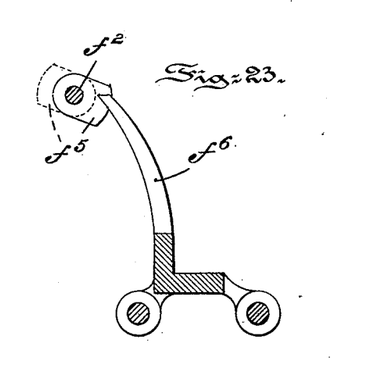
Fig. 23 is a detail cross-sectional view of the slide operating the lace-point shaft in a lateral or longitudinal direction.

The operation of the lace-points $f$ and the formation of the lacework fabric is clearly illustrated in Figs. 9 to 13 and Figs. 15 and 16. Referring to Figs. 9 to 13, the knitting-needles $b$ are first raised, so that their loops B are placed on the shanks below the beards. The lace-points $f$ are then lowered to the opsition shown in dotted lines in Fig. 9 to cover the beard of the needle. The knitting-needles and lace-points are then lowered together to the position illustrated in Fig. 10, in which position the loops B are shifted onto the lace-points $f$. The knitting-needles $b$ are now tilted away from the lace-points $f$, as shown in Fig. 11, a cam $a^{13}$ on shaft $a$ accomplishing this tilting through roller $a^{14}$ and lever-arm $a^{15}$, as clearly illustrated in Fig. 6. The knitting-needles and lace-points are then both raised and the lace-points $f$ shifted, as illustrated in Fig. 12, to convey the loops B to the knitting-needles $b$ next adjacent to the last position of the lace-points $f$. The needles and points are then lowered to the position shown in dotted lines in Fig. 13 and again raised after the sinkers $e$ have been thrust forward to pull down the loops from off of the lace-points $f$. The transfer-needles may then be removed or shifted out of their operative position. In Figs. 15 and 16 one pattern of lacework fabric is shown, wherein the transferred meshes or loops B are sent for a series of steps first from left to right and then for a corresponding series of steps from right to left, forming zigzag stripes or designs. Commencing with the bottom of the fabric of Fig. 16 the second loop B is transferred from left to right from the second to the third needle and also loops from the sixth to the seventh needle and from the tenth to the eleventh needles in the next to the bottom course of meshes. Several courses of regular meshes B' are then knit, when loops from the third, seventh, and eleventh needles are transferred, respectively, to the fourth, eighth, and twelfth needles. This operation continues until the return movement of the loop B in an opposite direction begins. The pattern-disk $g'$ controls this transferring operation, as hereinbefore explained, and by varying the conformation of the disk $g'$ plain stripes or varying designs of lace or open work can readily be obtained. During the formation of the heel portion of the fabric the lace-points $f$ should be thrown out of operation. This is secured by simply turning the shaft $f^2$, needle-bed $f'$, and needles $f$ upward to the position indicated by the dotted lines in Fig. 1. In this position of the shaft $f^2$ (see Fig. 23) its collars or projections $f^5$ clear the slide-arm $f^6$, and hence the said slide $f^6$ may travel independently of the shaft $f^2$. When the shaft $f^2$ raises and lowers, the points $f$ fail to engage the fabric. Since at this stage of the operation the fashioning-points $d$ are constantly in use, if the electromagnet $h$ is used to control the pawl $d^8$ the current is permanently established through the said magnet by turning the switch-lever $h^6$ into engagement with the contact $h^4$, thus directly connecting both terminals of the battery-circuit. When the mechanical means illustrated in Figs. 18 and 19 are employed, the pawl $d^8$, under the tension of a spring $d^{15}$, is shifted out of engagement with the ratchet-wheel $h^{10}$ into direct engagement with the ratchet $d^7$, as indicated in dotted lines in Fig. 19, a spring-catch $d^{16}$ engaging either of the recesses $d^{17}$ and $d^{18}$ of the pawl $d^8$ in the two positions required.

Having thus described the nature and object of my invention, what I claim as new, and desire to secure by Letters Patent, is—

1. In a straight-knitting machine, a set of lace-points, a pattern-disk controlling the shifting or transferring movements of said lace-points, a pawl adapted to advance said pattern-disk, an arm adapted to actuate said pawl, means controlled by the shogging-shaft for elevating and depressing said arm, a link carried by said arm, a second pawl adapted to be elevated and depressed by said link, a ratchet-wheel, a fashioning-point shaft adapted to be shifted longitudinally when said ratchet-wheel is advanced, and a pattern-chain operated by the shogging-shaft and adapted to periodically throw the second pawl into engagement with said ratchet-wheel.

2. In a straight-knitting machine, a set of lace-points and a pattern-disk controlling the shifting of said lace-points, a shogging-shaft controlling the movement of said pattern-disk, a fashioning-point shaft, a ratchet adapted to shift said fashioning-point shaft, a pawl adapted to advance said ratchet, a pattern-chain operated by the shogging-shaft, and electric means controlled by said pattern-chain for throwing the pawl periodically into and out of operative engagement with the ratchet-wheel.

In testimony whereof I have hereunto set my signature in the presence of two subscribing witnesses.

ALBERT GEE.

Witnesses:
J. WALTER DOUGLASS,
THOMAS M. SMITH.